United States Patent [19]
Nguyen et al.

[11] Patent Number: 6,009,063
[45] Date of Patent: Dec. 28, 1999

[54] UNIVERSAL PORTABLE MINIDISK DRIVE SYSTEM

[76] Inventors: Nam D. Nguyen; Min Ming Tarng, both of 1367 Glenmoor Way, San Jose, Calif. 95129

[21] Appl. No.: 08/871,814

[22] Filed: Jun. 9, 1997

Related U.S. Application Data

[63] Continuation-in-part of application No. 08/387,230, Feb. 13, 1995, abandoned, which is a continuation-in-part of application No. 07/947,800, Sep. 21, 1992, abandoned.

[51] Int. Cl.[6] .................................. G11B 7/00; G11B 5/56
[52] U.S. Cl. .................... 369/109; 369/44.14; 360/77.03
[58] Field of Search ................................. 369/109, 44.14, 369/44.19, 215, 222, 220, 244; 360/77.02, 77.03, 78.11, 15, 72.1, 137, 97.01

[56] References Cited

U.S. PATENT DOCUMENTS 5,268,801  12/1993  Hazel et al. ......................... 360/77.03
5,325,349   6/1994  Taniguchi ............................... 369/109

*Primary Examiner*—Ali Neyzari

[57] ABSTRACT

A universal portable minidisk drive system adopts the (1) universal head (2) laser pin (3) timing/coordinate clock track to have the long-time, continue-playing for all the different disk media such as optic disk, magnetic disk or magnetopic disk. The universal head enables the universal disk to read/write all the different disk that the portable computer only needs to have one kind of disk drive. The laser pin pushes the track density to the extreme limit that the minidisk can store a large amount data. The timing/coordinate clock track introduces the (track, sector) coordinate system to the disk that the access/recover time is reduced. The disk drive can play continuously in the vibrant environment.

18 Claims, 13 Drawing Sheets

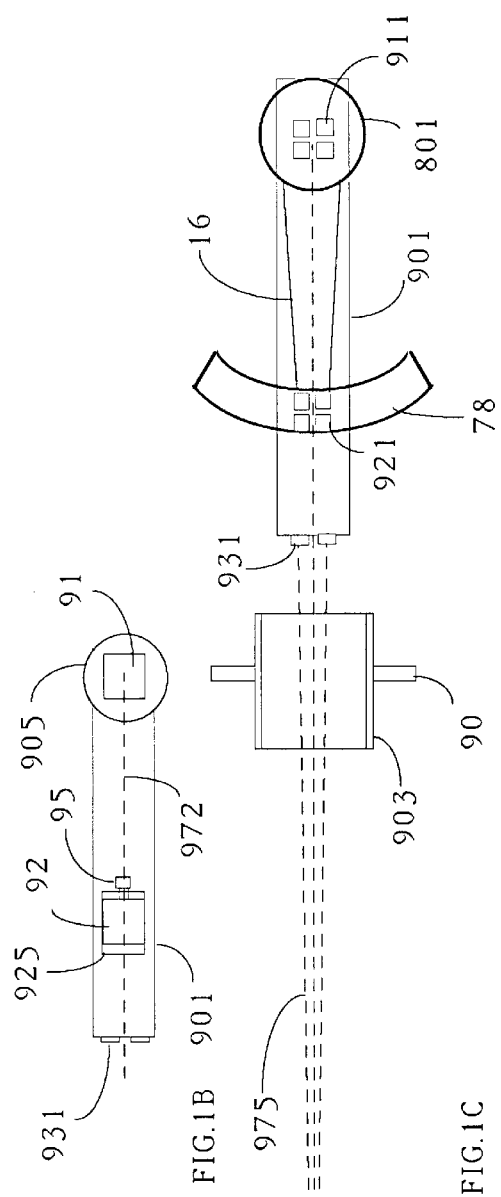
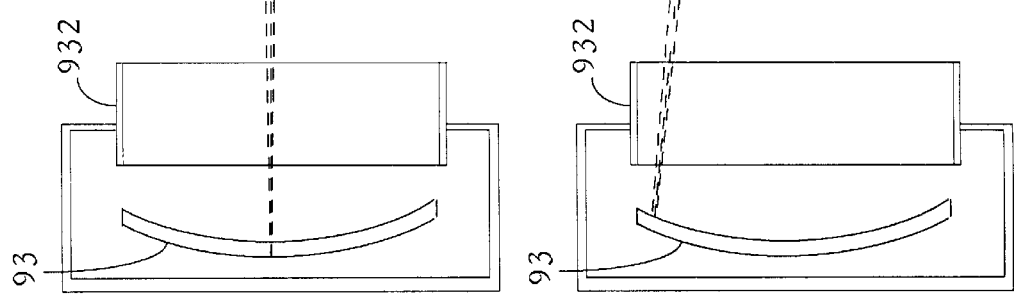
FIG.1B FIG.1C FIG.1D

UNIVERSAL PORTABLE MINIDISK DRIVE SYSTEM

This application is a continuation-in-part of Ser. No. 08/387,230 filed on Feb. 13, 1995, now abandoned which is a continue-in-part of Ser. No. 07/947,800, filed on Sep. 21, 1992, now abandoned. This invention is related generally to the universal disk drive system, and more specifically is to the unified approach of the portal universal disk drive and servo track writer mechanism for magnetic disk, optical disk and the magnetoptic disk that one disk drive can record and read/write as CD player, magnetic disk drive, optical disk drive and magnetoptic disk drive.

BACKGROUND OF THE INVENTION

Field of the Invention

Portable computer is the main tool in the information age. The space, weight and anti-vibration of the portable disk drive are the key issues in the portable computer design. However, in today design, the CD player, magnetic disk drive, floppy disk drive, optical disk drive are the separate designs. It is impossible to incorporate all the four kinds of disk drives in a portable computer. In the portable environment, the space is limited to one mini-disk. The mini-disk needs to have the ultra high density to store a large amount of data. We need to design a new approaches to push for the extreme limit of the ultra high density.

Furthermore, the portable computer is operated in the highly vibrant environments such as joggling, running, etc. The portable computer needs to continue playing without the interrupt due to the failure of the tracking of the head. For the above reasons, a completely revolutional new invention of disk drive is invented. We use the coordinate/clock track to reduce the access time and increase the high density. We use the universal head to reduce four different disk drives to be one single disk drive. We use the laser pin to decouple the tracking problem to be two sub-problems to have the capability to track the head directly push the extreme high density for the mini-portable disk. The concept of the trainee actuator follows and traces the trainer actuator with the guidance of the laser pin is a complete new concept. In our patent, we apply the angular amplification of the laser beam to the diffracted grating for the trainee actuator and use the laser guiding pin to guide the trainee actuator. The trainee actuator rotates to follow the guidance of the laser guiding pin.

As shown in the U.S. Pat. No. 5,268,801, the Hazel's patent uses a mirror attaching to the rotational axle of the trainee actuator. It will takes a lot effort to align the mirror on the trainee actuator accurately. Furthermore, his patent has the "angular amplification factor" of the laser light. However, the deflected light passing through the window at an angle. It will induce the track density uniformity errors which are not endurable in the portable mini-disk. It will reduce the track density a lot. Under the same set up of the servo system, even a small deviation angle of the mirror will cause the disk to lose a lot tracks or to start to write on the track which is outside the valid region. The horizontal swing of the setup table (mechanical translator 42) is so large. The mechanical translator mechanism will be worn out pretty soon. It is impossible to get the accurate alignment. The measurement facilities are at the far end to swing back and forth to search the tiny weak laser light. For the swinging long table, the small mechanical vibration will disturb the optical setup a lot.

As shown in the U.S. Pat. No. 5,268,801 Hazel At Al's principle is based on sensing the angle of the reflection laser beam. His principle, sensing the angle of the reflection beam, force him to place his position interpreter in the surface being parallel to the rotating axis of the actuator. This is not desirable location because it is not similar or near the location of the magnetic heads. Because the angle of the reflection beam is always parallel to the rotating axis of the actuator, hence his technique is inoperative in the most preferred situation in which the plane containing the position interpreter (the mirror for Hazel's principle) is perpendicular to rotating axis of the actuator. Moreover, Hazel at al's technique must use the arc transparent window which is too expensive to be use in the magnetic disk drive.

In the U.S. Pat. No. 5,325,349, the Taniguchi's patent uses an diffraction grating mounted on the actuator of the disk drive having the fixed laser source. Taniguchi's technique is well known by those skilled in the art to use moving diffraction grating and a fixed laser source to determine the position of the subject of interest. To meet the form factor of the magnetic disk drive industry, an angular actuator must be utilized. The angular diffraction grating is a diffraction grating with a plurality of lands and grooves being intercepted at one point and the linear diffraction grating is a diffraction grating with a plurality of lands and grooves being parallel. Hence Taniguchi must use an angular diffraction grating in his patent because the laser source of his design is fixed. To utilize the angular diffraction grating, one must align the virtual rotating point ( as shown in FIG. 3 in Taniguchi's patent) of the angular diffraction grating with the rotating axis (as shown in FIG. 2 in Taniguchi's patent) of the magnetic disk drive actuator. This virtual rotating point is not physically real. It is an imaginary interception point of all the extended lands and grooves of the angular diffraction grating. Hence it is require the complex tool and highly skillful technician to assembly the angular diffraction grating. Beside those problems above, as he stated in his patent specifications, Taniguchi At Al must degrade the position resolution to trade off for the use of a smaller angular diffraction grating. Moreover, Taniguchi At Al's technique is the laser source fixed (not moveable); therefore the technique must sense different lands and grooves of the angular diffraction grating to cover the whole angle of rotation. None of angular diffraction grating is perfect and hence there are mismatched lands and grooves. Beside of these differences of lands and grooves there is distortion of the angular diffraction grating. It is impossible to manufacture the high volume magnetic disk drive with the utility of an angular diffraction grating in every magnetic disk drive.

In Taniguchi's patent, there is no "angular amplification factor" of the laser beam. Even the laser light is raised up to have the longer laser light flying path, the accuracy of the track position doesn't improve at all. On the contrary, the accuracy of the track position is decreased.

Increasing the laser light flying path, only there is the angular change of the laser beam, the resolution of the track density can be increased. The actuator is followed the sinusoidal curve to find the track position. At the track position, the sinusoidal curve has the differential to be zero and follow the variance to be the cosine. In other words, it is not sensitive for the variance of the track position. To get high accuracy of the track, we need to increase the sensitivity of the diffraction grating. Both of their patents use the external reflective means attaching to the magnetic disk actuator arm. It has the reproduction problem in the mass production line. However, it is noted that the Hazel's patent cannot apply to the Taniguchi's patent. The Hazel's patent has only the angular amplification concept; the Taniguchi's patent has only the diffraction grating concept. For the Taniguchi's patent, it is no use to increase the flight path. Taniguchi's patent has no angular amplification factor at all. It is impossible to combine the patent having no angular amplification with the patent having the angular amplification factor. In Taniguchi's patent, for the laser beam having no angular change, increasing the laser traveling path, the larger the beam spot is and the lower the resolution of track density is.

Without our new concept of the trainee actuator tracing the laser guiding pin to divide and conquer the problem, the angular amplification of the laser beam cannot cooperate with the diffraction grating. Using the new concept, trainee actuator tracing trainer actuator with optical pin, the problem is divided to be angular amplification and the exact tracking problems.

As shown in FIG. 4B, the prior arts of their patents do not know how to use the divide conquer methodology. Both of them try to locate the actuator track position directly. Their patent have no servo arm concept and exact tracking concept. So they cannot divide and conquer the problem. It is noted that Taniguchi's patent doesn't have the servo writer trainer actuator concept.

As shown in FIG. 4C, our patent combines the trainer actuator concept with laser pin concept, using the divide and conquer methodology, our solution is a two-steps solution. The trainer actuator is to divide the track problem to be the first sub-problem: track position of the servo actuator; and the second sub-problem: the tracking problem of the trainee actuator. We first set the track position of trainer actuator with high accuracy, then we set the actuator to follow the servo arm exactly. The track position sub-problem of the trainer actuator is solved with the combination of angular amplification and the reflective diffraction. The trainee actuator tracking sub-problem is solved with the laser pin.

For the angular amplification of the laser beam, instead of swinging the "translator setup table" as the Hazel's patent does, in our patent, we swing the laser beam to have the "angular amplification". The translator setup table for Hazel's table has the limit of the table length. Our patent has no limit on the length of the laser path.

Because magnetic disk drive industry is very competitive, the most important fact is to maintain the minimum cost. To achieve this objective, to put the expensive component (the angular diffraction grating) on the equipment (servo writer system) of the manufacture, not on the final product ( the magnetic disk drive). The customer will not buy it. Furthermore, it causes the alignment problem and the reproduction problem.

Furthermore, for the ultra density disk drive, "as it is" is the most robust design principle for the portable mini-disk drive. Otherwise, the track position works can not repeat at all. The minor deviation in the alignment of the human installed the mirror or diffraction grating in Hazel's or Taniguchi's patents will cause the deviation of several hundred track errors in the ultra high density disk. In other words, the different disks have the several hundreds tracks mismatch in the track position process. This mismatch result cannot be endured. So, both the Hazel's patent and the Taniguchi's patent are not workable patent.

In the high tech field, minor violation of the fundamental principle will cause the design not working. Both the Hazel's patent and Taniguchi's patent violate the fundamental of magnetic disk drive principle, as it is. They added the extra components to the disk drive. So their disk drive doesn't work in the mass production. It is impossible to re-produce the same alignment and track position result for the different disk. Our patent follows the fundamental principle of "as it is". Our disk drive system not only works but also save a lot cost of the disk drive. For the portable mini-disk drive, it should not add any additional component in the servo writing process.

The Taniguchi's patent needs to install the high cost angular diffraction grating on the actuator. With the same setup, the Hazel's patent has to install the mirror with high accuracy to have the trainee actuator to locate at the proper track region. Otherwise, the Hazel's patent has to re-calibrate the setup for each disk drive to locate the actuator in the correct track region. This work cannot be repeated exactly for each disk drive that each disk drive has the different track region. This cannot be accepted for the mass production. Basically, the Hazel's patent is useless at all. The same reason is applied to the Taniguchi's patent. It is impossible to install the diffraction grating on the actuator exactly at the same position. However, the track region is defined by the position of the diffraction grating. So, no two disk will have the same track reason. For the ultra high density, such kind a manual error of alignment causes hundred tracks difference. Such kind a result cannot be accepted.

Comparing with the Taniguchi's and Hazel's patents, our invention is the only useful and practical system. For our patent, the position device such as diffraction grating is mounted on the servo writer system instead of the disk drive system. The trainee actuator has both the head and the rotational axle to be aligned with the virtual head and rotational axle trainer actuator respectfully. For the same servo writer, all the disk drive have the same track regions. It is easily to calibrate the different servo with the same standard. So, all the disk drive of our patent have exactly the same track region definition. It is pretty easy to standardize the universal disk in the mass production.

As bit density (bits per inch) increases, the read and write channel must reliably record and retrieve serial data. To retrieve the recorded data, the control unit must have two signal lines: a data signal and a sampling clock. Conventional read channel receives only one data signal from a subject magnetic head. They must extract the sampling clock signal by means of a phase lock loop. The read channel of conventional magnetic disk drive can not utilize a crystal system clock as a reference because of the following factors:

a) The static and dynamic speed variation of spindle motor;

b) The eccentricity generated during fastening disks to the shaft of the magnetic disk drive spindle motor (This eccentricity creates variation in the relative linear velocity between the magnetic heads and disks);

c) The run-out of Spindle motor.

The synchronization of all of the previously designed magnetic disk drives using the crystal system clocks is not optional. The closed loop speed control system in the prior art utilize back electromotive-force or Hall-effect sensors to regulate the velocity of the spindle motor. Hall-effect sensors are very fragile. They can be destroyed during the component assembly of the spindle motor. Furthermore, there are very few pulses per revolution generated by these sensors. Hence, the resolution is too coarse to have precise synchronization between the spindle motor and a crystal reference system clock. These systems also require a component actively trimming process to obtain a good average speed (not an instantaneous speed). The component actively trimming process is very expensive and it is labor intensive.

Conventional read channels (both analog and digital read channels) lose their synchronization when encountering a media defect or a drop out. They require more intelligent circuits to detect a media defect and to inhibit phase detector output. Currently, the conventional read channels cannot match the increasing rate of bit density. The speed of the spindle motor in the magnetic disk drive must therefore be decreased. This low spindle motor speed increases the access time of the magnetic disk drive.

It is very expensive to design and fabricate the high capacity and performance magnetic disk drive using the conventional designs. It requires high precision components to compensate for the weak interconnection of the head disk assembly subsystems. Therefore, both a high track density and a high bit density demand a new concept of design and manufacture.

Unlike the previously designed magnetic disk drives, the universal disk drive subsystems of this invention are strongly interrelated. A chief aspect of the intimate interconnection is a precise synchronization between the spindle motor and the crystal system clock. The read and write channels and the read back servo position signals can take advantage of this precise synchronization for improving performance and reliability.

SUMMARY OF THE INVENTION

To have the portable universal mini-disk, the breakthrough of technologies adopted in our invention are (1) write/read any disk with the universal head; (2) real-time play and operation with coordinate/timing clock; (3) guiding the rotation of trainee actuator with the non-contact laser-pin. To push for the ultra limit track density, our invention (1) creates a virtual clean room environment; (2) creates a virtual dark room environment; (3) using the laser pin to make the direct guidance for the read/write head; (4) making the optical alignment for both the head and the rotational axle; (5) using the angular amplification factor of the sweeping laser beam to get the high track resolution; etc. This invention comprises the universal disk drive system for the portable computer. Servo track writing system has an external trainer actuator, a trainer actuator. The external trainer actuator guides the universal disk drive actuator with a laser beam and a plurality of photo diodes or photo detectors. A laser source, attached to the trainer actuator, focuses its laser beam on the plurality of knotches or photo diodes which are on the head or the actuator of the magnetic disk drive. During the position training process, a closed loop position control system of the magnetic disk drive actuator utilizes the outputs of the plurality of photo diodes or photo-detectors as its position feedback signal to guide the actuator of the magnetic disk drive at a subject position. This positional training process places the tracks of position information on all magnetic media surface disks.

The second fixed universal head senses the timing/coordinate clock patterns and an embedded index mark to provide the timing/coordinate clock for the servo writing information process. The clock/coordinate patterns and the index are recorded previously during the disk certification process.

Another advantages of the present invention is that it does not require the use of an angular (arc) diffraction grating as it requires by the prior art. The use of angular diffraction grating is prohibit in the magnetic disk drive due to the complex of manufacturing and assembling of the magnetic disk drive. Moreover, the cost of the angular diffraction grating is more than the cost of the magnetic disk drive itself.

Another embodiment of this invention is the servo track writing with an actuator of the optical storage drive. The optical storage drive is the compact disk drive known as CD or any other optical storage device such as MO drive. This external trainer actuator guides the universal disk drive actuator by a laser beam and a dual photo diodes. A laser source, the optical head of the optical storage drive, also focuses its laser beam on the dual photo diodes or knotch which are on the actuator of the universal disk drive.

During the position training process of the universal/magnetic storage device, a closed loop position control system of the universal/magnetic disk drive actuator utilizes the outputs of the dual photo diodes/detectors as its position feedback signal for guiding the actuator of the universal/magnetic disk drive to a subject position. This positional training process places the track position information on all universal/magnetic media surface disks; this process is known as a servo-writing process by the universal/magnetic storage disk drive industry. These and other objects and advantages will become apparent to those skilled in the art in view of the description of best presently known mode of carrying out the invention as described herein and as illustrated in the drawings.

BRIEF DESCRIPTION OF DRAWINGS

FIGS. 1A–1J show one implementation of the universal portable disk system; (A) shows the laser pin mounted on the trainer actuator guiding the trainee actuator of the disk drive to write the ultra finest tracks to have the maximum track density; (B) is the top view of the trainer actuator serving as the track position measurement and locator purpose; (C) is the trainer actuator using the laser guiding pin to guide the universal disk trainee actuator at the central position; (D) is the trainer actuator of servo writer using the laser pin to guide the trainee actuator of the universal portable disk drive to rotate to the extreme end track position of track region; (E) is the structure of the universal disk drive; (F) is the knotch on the top of rotational axle to align the rotational axial of the trainer actuator with the rotational axle of the trainee actuator; (G) is the knotch on the top of the universal head to guide the universal head to the correct track under the guidance of the laser guiding pin; (H) is the side view of the universal head; (I) is the bottom view of the universal head; (J) is the cross section view of the universal head taken at the section J—J in FIG. 1H.

DETAILED DESCRIPTION OF THE INVENTION

Figure 1A:
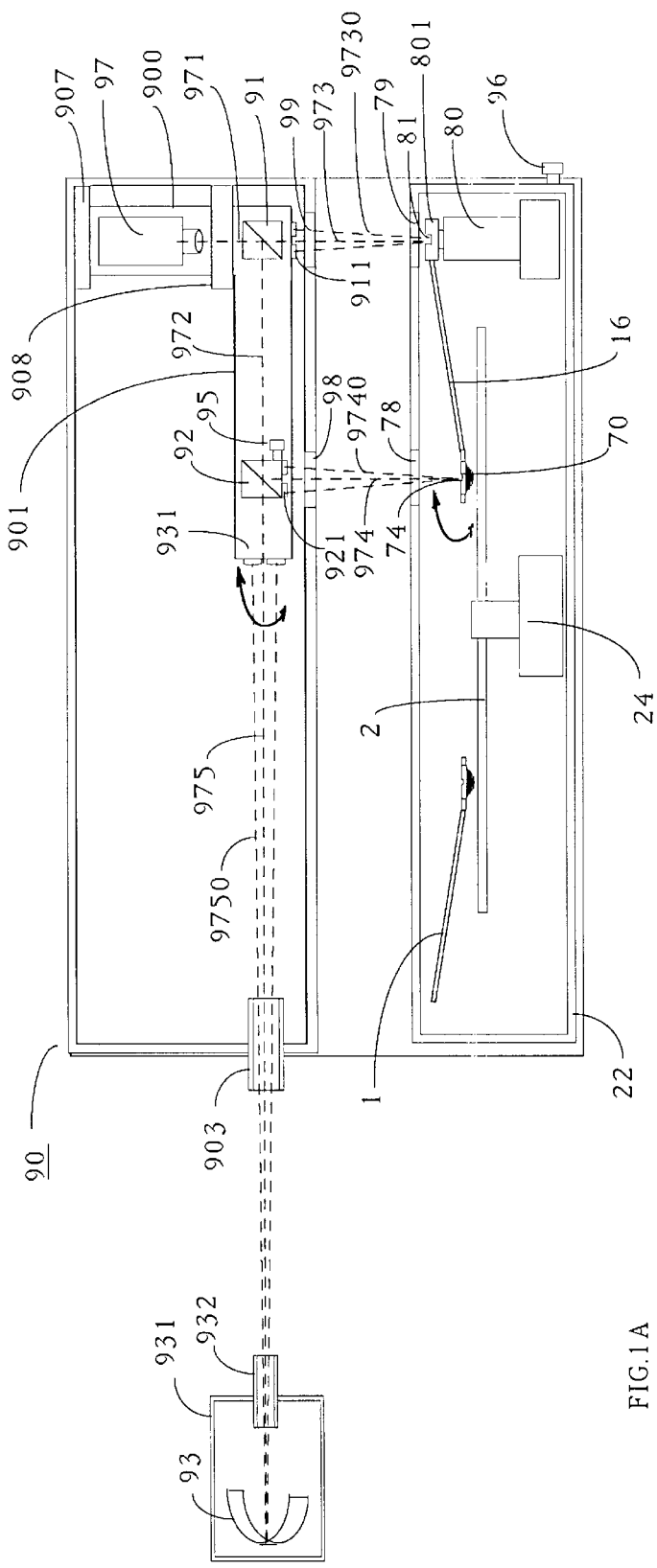

Since the palm-top portable computer is so small, the disk drive fitting in the palm-top computer needs to have the one and only small disk, say 1½" disk. The universal disk drive uses the unified approach that it can play all the different disk record media such as the CD, magnetic disk, optical disk, magnetoptic disk, etc. Due to the advancement in the micro-machine and micro-circuit, the universal head combines the surface-emitting laser diode, photo-detector and the magnetic head to be one single unitary head. The universal head can read/write the magnetoptic disk, magnetic disk and play the optic disk. Furthermore, the head has the new design of the combinatory design of the magnetic head, optical read/write head. It not only reads and writes the magnetic disk but also reads and writes the optical disk with the light or the combinatory action of the light and magnetic field.

So, we need to push the track density to be the ultra high density limit. To push the ultra limit of the track density, the servo for the universal disk drive not only traces on the head directly but also aligns the rotational axis position of the servo with the rotational axis position of the disk drive. Aligning both the axle axis and the head with the laser guiding pin, the universal disk drive track density can be pushed to the limit of the track density.

To increase the bit density in the sectors, the coordinate/clock information is pre-recorded on the track locating on the rim of the disk. The coordinate/clock information is read back with the second fixed head. All the bit position can be identified with the coordinate pair (track, coordinate/clock). With the data head and coordinate/clock head two head system disk drive design, the sector density is pushed to the limit. Furthermore, the bit density per section can be enhanced with the cooperation of the laser light with the magnetic field. The bit density is the product of the track density, section density. So, the universal disk drive has the highest density.

The specification of the universal disk drive for the portable computer is that (1) it can run the all the different disks with the same disk drive, i.e., universal disk; (2) it is needed to push for the ultra-high density with the repeatable quality and the same track region definition for all the different disks; (3) the disk and head can be protected from the scratch without the loss of the track density; (4) the recovering time is negligible that the disk drive can continue operating in the vibration jump environment. So, to have the universal disk drive for the portable computer, we do need to have all the whole system to be re-designed with the new technologies. It cannot be revised piece by piece. In our invention, we integrated all the technology breakthroughs to have one workable disk drive to meet all the specifications of the portable computer. As shown in FIG. 1, the universal disk is equipped with the universal bead and uses the laser optical guiding pin technique to guide the trainee actuator. The disk 2 can be the removable magnetic disk, optical disk, floppy disk, or magnetoptic disk, etc. Trainer actuator is an actuator of the servo writer sub-system and this position sensor can be a Michelson Interferometer or an angular diffraction grating system. The position of the photo detector or reflector is fastened to the head of the trainee actuator disk drive sub-system.

To push the track density to the limit, it is well-known that the measurement of the head position should be measured at the head directly. However, it is impossible to mount a retroflector assembly on the head assembly actuator of the disk drive and directs reflected light to a fixed laser interferometer. Furthermore, today's resolution of track density requirement is even less than the resolution of the order of the wave length. It is the long-felt problem and congested research area. However, nobody can solve this problem. Everybody thinks that it is impossible to mount the retroflector assembly on the head to make the position of head directly. We uses the divide and conquer methodology to overcome this problem. However, we invent the optical guiding pin mounting on the rotational arm of the trainer actuator. With the optical guiding pin, two sub-problems are formalized: (1) how can the head of the trainee actuator follow the head of the trainer exactly? (2) how to get the highest track density for the head of the trainer actuator? To solve the head problem of the trainee actuator, we use the photo-detector array method for both the head position and the center of the axle. To solve the track density problem, we combine both the angular amplification and the interferometer of the laser beam to get the much more resolution of the track density than the prior art does.

The laser light targets at the diffraction grating which is located far away from the rotational axis of the servo actuator. Our trainer actuator has much more track density resolution than the prior art has. Another advantage of our invention is that the universal disk drive does not utilize an angular diffraction grating (arc optical encoder) as it is required by the prior art. In the universal disk drive system, the diffraction grating is used in the servo writer system, not the universal disk drive system. The use of angular diffraction grating is prohibited in the magnetic disk drive due to the complex of manufacturing and assembling of the angular diffraction grating in the magnetic disk drive and due to the cost of an angular diffraction grating disk drive itself.

Unlike the prior arts our principle is the trainer actuator carries the laser source. The laser source focuses on the radiation detector means or reflective means fastened to the trainee actuator. Hence the same and the only one radiation detector means or other position interpreter means (a linear diffraction grating with one land or one grove, a reflective stripe) is utilized to cover the whole angle of rotation. This unique advantage converts all errors ( such as a mismatch between the diodes of the dual photo diode element and etc.) to become a relative error which cannot degrade the position resolution of this invention. Because the relative error only effects the position of the whole data band (the band of the whole data cylinders) not the position between the data cylinder. There is a plenty of error margin for the position of the data band on the magnetic media disk. The resolution of other components prevents the magnetic heads moving out of the magnetic media disks. In fact, this relative error is insignificant.

In the laser pin tracking, we further use the "push-pull" type differential array, such as photo diodes or detectors, to detect the track position. The push-pull type differential array is much more accurate than the diffraction grating does. It makes the trainee actuator following the trainer actuator with the much higher track density resolution. With the laser pin, the trainee actuator follows the trainer actuator with high accuracy. So, with two steps divide-and-conquer methodology, our patent has much more track density resolution than the prior art has.

To get rid of the external contention to have "virtual clean room" effect, the disk drive 22 and servo writer 90 are enclosed in the closed cases with the windows 78, 79, 98 and 99 mounted on them. To get rid of the external light disturbance, the laser fight path is enclosed in the "dark room' with the light shield covers 932 and 903 to shield the external light disturbance. During the servo writing process, there is no need to modify or add any extra component to the disk drive 22.

From this point on in this discussion, the external positional trainer actuator will be referred as the trainer actuator or the actuator of the optical storage subsystem. The actuator of the magnetic storage subsystem will be referred as the trainee actuator. A fixed universal/magnetic head 1 is attached to a stationary location inside the magnetic disk drive. This stationary location should be near the path of the magnetic recording data heads 3 of the magnetic disk drive 22.

FIG. 1 shows one implementation of the universal portable disk drive. The single laser 97 is mounted on the axle 900 of the servo writer 90. The bearings 907 and 908 rotationally holds the vertical axle 900. The laser 97 rotates with the axle 900 that the laser beam will not change position during the rotation. The laser beam 971 passes through the splitter 91 and separates into two beams 972 and 973. As shown in FIG. 1A and FIG. 1E, the beam 973 goes straight to hit on the knotch 81 on the top of the rotational axle 801 of the disk drive 22. The reflective beam 972 goes along the rotational arm 901 and hits on the second splitter 92. The laser beam 972 is further splitted to be the laser beam 975 and the reflected beam 974. As shown in FIG. 1A and FIG. 1G, the reflected beam hits on the knotch 74 on the top of the head 70 of the disk drive 22. The laser beam 975 goes straight to hit on the diffraction grating 93 on the far side.

Figure 1E:
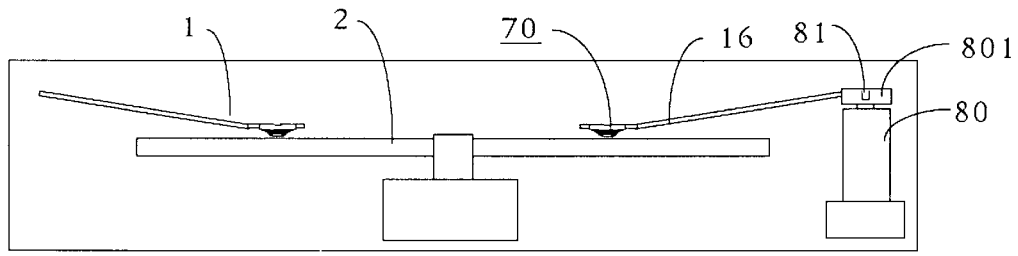
Figure 1F:
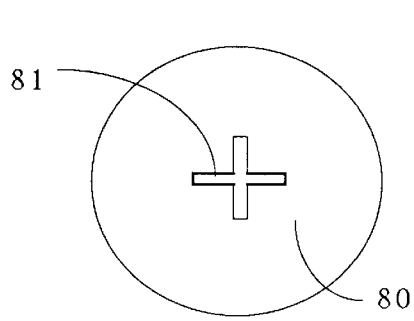

As shown in FIG. 1A, FIG. 1B, FIG. 1C, FIG. 1D and FIG. 1F, to align the center of the axis of the axle 900 of the trainer actuator with the axle 801 of the disk drive 22, the laser beams 971 and 973 are in line with the center of the axis of the rotational axle 900 first. FIG. 1F shows the top view of the rotating axle 801 which has the tracking knotch. The laser beam 973 passes through the window 99 mounted on the bottom plate of servo writer 90 and the window 79 mounted on the top plate of the disk drive 22 to hit on the knotch 81 knotched on the top of the rotatable axle 801 of the rotatable arm 77 of the disk drive 22. As shown in FIG. 1A, FIG. 1C and FIG. 1D, the laser beam 973 hits on the cross-knotch 81 on the top of the rotational axle 801 of the disk drive 22, the reflected diffracted beam 9730 hits on the photo-detector array 911 mounted beneath the axle 900. From the differential output of the photo-detector array 911, the adjusting screw mechanism means 96 can either be adjusted manually or automatically to have the differential output of the photo-detector array 911 to be zero. As the differential output of the photo-detector array means 911 has the zero output, the center of axis of the axle 900 of servo writer 90 is coincident with the center of axis of the axle of the disk drive 22.

Figure 1G:
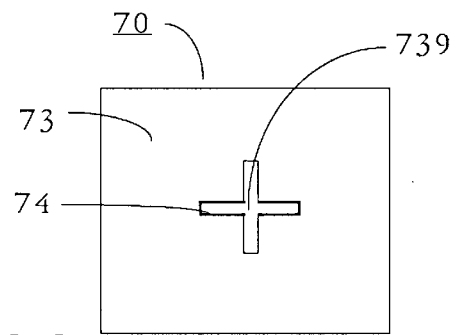

As shown in FIG. 1A, FIG. 1B, FIG. 1C, FIG. 1D and FIG. 1G, after the center of axle 80 of the disk drive 22 is in line with the center of axle 900 of the servo writer 90, the rotatable trainer actuator 901 starts to rotate to search for the trainee actuator 77 as shown by the arrow in the FIG. 1A. As the horizontal segment 901 of the servo arm is in line with the rotational arm 77 of the disk drive 22. As shown in FIG. 1A and FIG. 1G, the splitter 92 slides back and forth to have the laser beam 974 to impinge on the knotch 74 on the top of the head 73. As shown in FIG. 1A, FIG. 1B and FIG. 1D, the laser beam 974 passes through the window 98 mounted on the bottom plate of servo writer 90 and the plane window 78 mounted on the top plate of the disk drive 22 to hit on the head 74 mounted on the trainee actuator 77 of the disk drive 22. FIG. 1G is the top view of the universal head which has the tracking knotches. The reflected diffracted light 9740 going through the windows 78 and 98 hits on the photo-detector array means 921 mounted beneath the splitter 92. The differential output of the photo-detector array means 921 adjusts the radial direction misalignment first. As shown in FIG. 1B, from the differential output of the photo-detector array means 921 in the radial direction, the screw adjusting means 95 is adjusted automatically to have the differential output in the radial direction to be zero. As the differential output in the radial direction is zero, it implies the radius of the trainer actuator is exactly the same as the radius of the trainee actuator. The radius of the trainer actuator is measured from the laser impinging point on the splitter 91 to the laser impinging point on the splitter 92. The radius of the disk drive is measured from the center of the axis of the rotational axle 801 to the center of the knotch on the top of the head 74. As the differential output of the photo-detector array means 921 has the radial directional output component to be zero, the servo writer has finished the calibration work. Now the universal disk drive 22 starts to rotate its trainer actuator 77 to have the transverse directional component of the differential output of the photo-detector array means 921 to be zero. As shown in FIG. 1C, as the transversal component of the differential output of the photo-detector means 921 to be zero, it implies that the center of the head 70 of the disk drive 22 is exactly aligned with the center of the head of the trainer actuator 901 of the servo writer 90. The virtual head of the trainer actuator 901 is the impinging point of the laser beam 901 impinging on the splitter 92. Now, the alignment of the trainer actuator and trainee actuator is done. The next step is to write the track information on the disk 2.

As shown in FIG. 1A and FIG. 1D, the trainer actuator 901 of the servo writer rotates to the extreme point of the track region on the disk 2. As shown in FIG. 1C and FIG. 1D, the trainee actuator 77 of the disk drive 22 starts to rotate to trace the laser pin 974. The tracing process will stop until the transversal component of the differential output of the photo-detector array means 921 is zero. The laser beam 975 flies across the long fight path going through the light shielding slot 903 and 932 impinges on the diffraction grating located at the far end.

To push for limit of the track density, we not only need the clean room but also the dark room. To have the large angular amplification factor, the longer the laser flying path the more accurate the track density is. So, we need the large dark room. For the patents of prior arts, it is impossible to build a large dark room for his translator setup table. Furthermore, we can put the cover on the remote diffraction grating to have the virtual "dark room" effect to minimize the external light disturbance to increase the track density resolution easily.

The first grating is corresponding to the first track. The reflected diffracted wave 9750 flies back to impinge on the photo-detector array means 931 mounted at the end of the horizontal segment 901. The differential output of the photo-detector array means 931 will be used to drive the voice coil motor to align the trainer actuator 901 of the servo writer 90 on the first grating of the diffraction grating 93 exactly. As the differential output of the photo-detector array means 931 is zero, the head of the trainer actuator 901 is located on the first track exactly. At the same time, the trainer actuator 77 of the disk drive 22 always traces the head of the trainer actuator 901. As the differential output of the photo-detector array means 921 is equal to zero, the center of the head 73 of the disk drive 22 is exactly aligned with the center of the head 739 of the trainer actuator 77 of the servo writer 22. As both the differential output of the photo-detector array means 931 and the differential output of the photo-detector array means 921 are zero, the head 70 of the disk drive 22 is exactly located on the first track of disk 2. The disk drive 22 issues the command to write the track information on the first track. After the first track information is written on the disk 2, the servo writer issues the command to find the second track. The trainer actuator 901 of the servo writer 90 rotates incrementally until the second track position is located. The diffraction grating 93 is designed to correspond the tracks having the uniform track pitches for the maximum track density. As the differential output of the photo-detector array means 931 changing signs to cross the zero point, it is the second track position. The trainer actuator stops to rotate and wait for the trainee actuator 77 to settle on the second track of the disk 2. Then the head 70 starts to write the second track information on the disk 2. This process repeats until all the tracks are written on the track region of the disk 2.

The magnetic disk is afraid of the scratch of the head. In the vibration environment, both the disk and the head need the coating to protect them. To coat the protection layer, there is a distance between the head and the disk. To keep the high density of the disk, the head has to use the laser light which is focused on the surface of the disk. Due to the advancement of the surface emitted laser diode and the micro-machine, the micro Lens can be formed on the head with the state of art of the micro machine techniques. Furthermore, with the micro-machine art, we can integrate the photo detector and the magnetic head on the same head to be a universal head. Our head is the universal head which can read/write all the different disk. For the magnetoptic disk, the laser and magnetic field are cooperated to write the disk. The photo detector is to read the data back. For the optic disk, the photo detector and laser are cooperated to read the data back. For the magnetic disk, the magnetic head write and read the data. Using the swinging type movable arm, we can have the multiple disk and the fast speed to reduce the access time. For the multi-layer disk, we can adjust the focus on the layer to write and read the data.

It is well-known that if the measurement can be made at the head position of the disk drive directly, it will push the track density to the limit. However, so far, nobody can make it. Everybody thinks that it is impossible to put the mirror or Lens at the head to measure the head position directly. Now, with the laser guiding pin concept, we make a knotch on the head. It even reduces the weight of the head. It is the first time we can guide the head of disk drive directly to write at the correct desired track position. Furthermore, not only the head position is under the control but also the axis of the rotational axle of the disk drive is aligned with the axis of the rotational axle of the servo writer. For one circular motion of the actuator, the servo writer fully aligns with the disk drive with both the head and the axis of the rotational axle. It implies that there is no mismatch alignment errors induced in the servo writer writing process. So, our patent can push the track density to the limit.

Figure 1H:
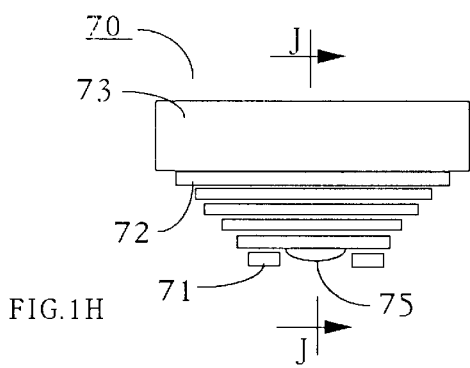
Figure 1I:
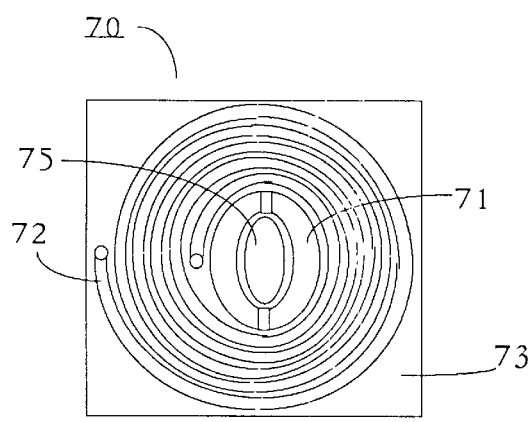
Figure 1J:
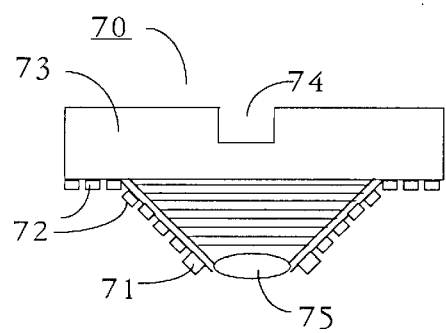

For the portable computer, the only disk drive needs to be the universal disk drive. It needs to read/write the magnetic disk, magnetoptic disk and play the CD ROM. So the head of the universal disk needs to be the universal head 70. As shown in FIG. 1H, FIG. 1I and FIG. 1J, the universal head 70 is comprised of the magnetic head 72, the photo-detector head 71 and the light emitting surface diode 76 with the micro-lens 75. FIG. 1H shows the universal head 70 for the universal portable disk drive system. It is the side view of the universal head 70. FIG. 1J is the cross-section view of the universal head 70 taking at the section J—J in FIG. 1H. FIG. 1I is the bottom view of the universal head 70. As shown in FIG. 1A and FIG. 1H, to adjust the focus plane of the head 70, the rotational axle 801 can be raised up and lowered down to adjust the focus plane of the micro-Lens 75. For the multi-layer disk, this focus adjustment feature is extremely important. With the laser light focusing plane, we can make the selection of the layer which we want to read/write from the multi-layer disk.

As shown in FIG. 1I, the opening in middle of the spiral conducting wire is a "singular" point. All the magnetic field generated with the planar spiral conducting wires passing through the small hole that the magnetic field in the middle "eye" portion. The magnetic field is extremely high in the eye portion. The spiral thin film 72 generates the strong magnetic field that it can easily to read/write the magnetic disk and/or the magnetopic disk.

The layered structure 77 is the surface emitting laser diode. The microlens 75 focuses the surface emitting laser on the disk 2. The photo detector 71 detects the laser light reflected from the disk 2 to read the data back.

In the vibrant environment of portable computer, the disk and the head should be protected and the access time or the recover time needs to be small. To protect the disk and head, the thin surface coating can be applied to both the surface of the disk 2 and the head 73.

To reduce the recover time after the jumping of the head, the phase-lock-loop approach cannot be accepted. It needs to takes a lot of time to retrace the spindle signal and synchronize with the system clock. After all the system is stabilized, the data of the track information and sector information are read back to identify where the head is. Then the head starts to move the correct direction. It takes too much time to go through the whole process. We need the "disk clock" and "sector information" that the head 1 can read the track information, sector information and data in respect of the disk speed. So, we needs the absolute disk information and the absolute track information. The absolute track information can be read from the disk directly as long as the head 1 can read at any disk speed. The clock and the sector information can be read from the disk on a fixed track with another fixed head. FIG. 1E shows the universal portable disk drive having two heads. The second fixed head 1 reads the clock and sector information. An optical head senses the timing/coordinate clock patterns and an embedded index mark on the optical media disk to provide the timing clock for the servo writing information process. The clock patterns and the index are recorded previously during the optical media diskette manufacturing process.

Due to an intrinsic torque ripple of the spindle motor, this precise synchronization never occurs in any prior art magnetic disk drive. The read and write channel and the position servo bursts have a better signal to noise ratio due to this precise synchronization. The servo bursts will have a better signal to noise ratio due to this precise synchronization. These enhancements are well known by those skilled in the art if this precise synchronization can occur.

With the small modification of the disk mounting device, it is easily to have all the different disks with the different package to adapt to the universal disk drive. Furthermore, it is extremely easy to modify the laser pin technique for the other disks to have the ultra-high track density.

Furthermore, the advanced techniques of the universal disk system can be applied to the other conventional disk drive to improve their disk track density a lot. The advanced portable disk drive system also can be applied to the conventional hard disk drive for the desktop computer. The conventional magnetic disk drives are magnetic data storage devices. They comprise multiple magnetic disks stacked on one spindle motor, an actuator carrying a plurality of magnetic heads, a control unit, and the supporting circuits. Data are serially recorded on the concentric tracks of each magnetic disk surface. To write or read data, the actuator must precisely move the magnetic heads to the desired data track positions repeatedly and reliably.

Figure 3:
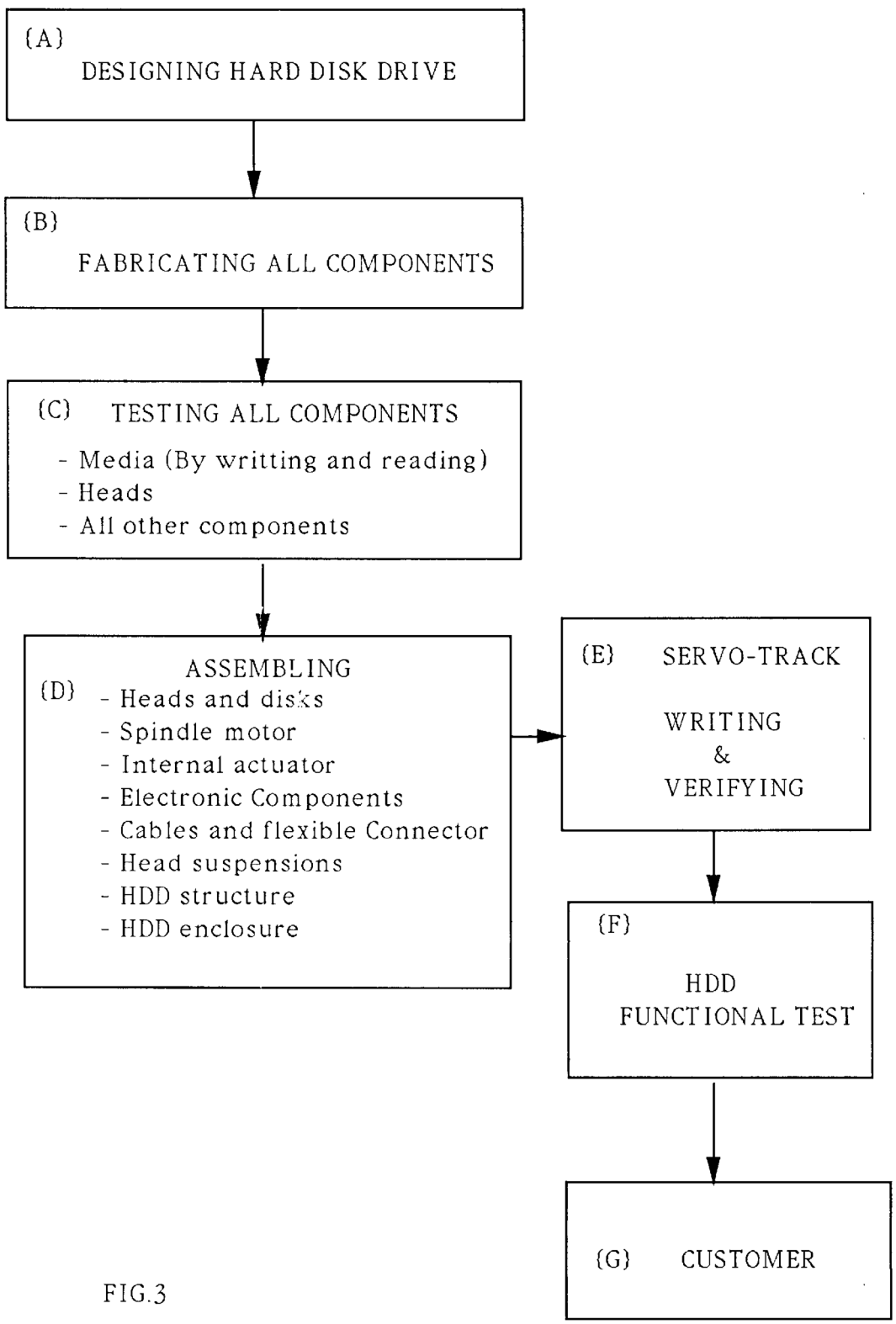
FIG. 3 shows a flow chart for designing and manufacturing the universal disk drive.

As density (tracks per inch) increases, a closed loop position control system is required to guide the magnetic disk assembly actuator. This closed loop position control system must have a position feedback signal. To provide the position feedback signal, tracks of position information are placed on the surface disks by a servo track writer. A sector servo system is used to accommodate high track density because tracks of position information are recorded contiguous with the data tracks. Hence, the data track of interest can be followed with greater accuracy. FIG. 3 is a flow chart for designing and fabricating a magnetic disk drive. This invention is corresponding to block E, and is a new method of placing tracks of position information (servo writing process) on the media disks of the head disk assembly.

Figure 4A:
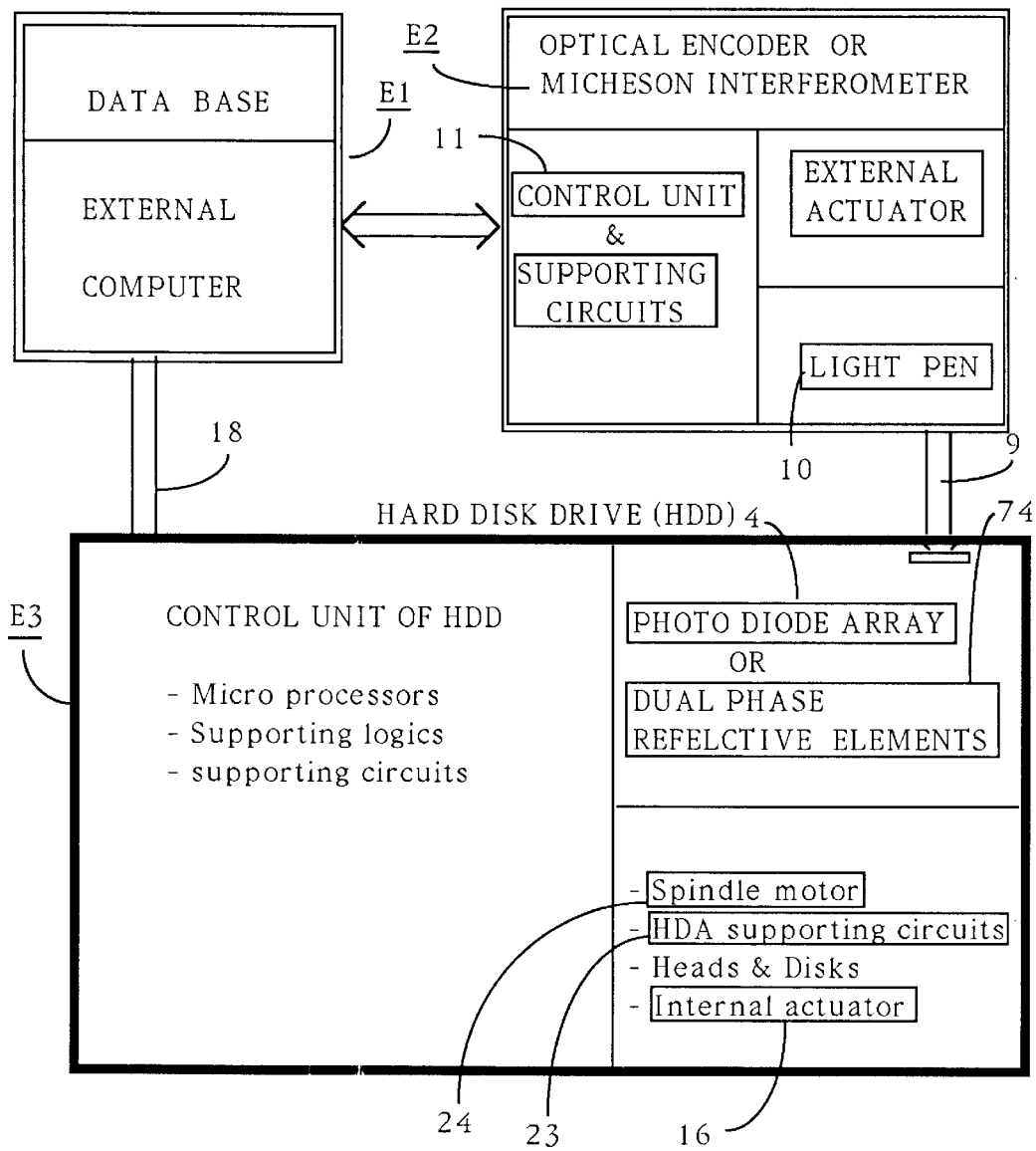
FIGS. 4A–4C, where: (A) shows a system building block of the servo track writer and the universal disk drive; (B) is the block diagram of the prior art of the Taniguchi's patent and Hazel's patent which doesn't adopt the divide and conquer methodology with the laser pin; (C) is the block diagram of our invention which adopts the divide and conquer methodology with the laser pin to formalize the problem to be two sub-problems.
Figure 4B:
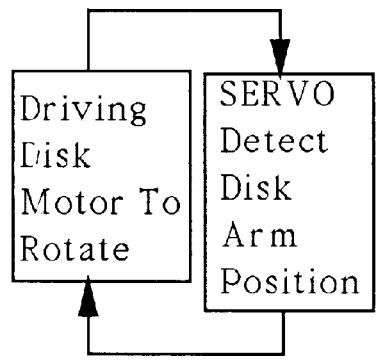
Figure 4C:
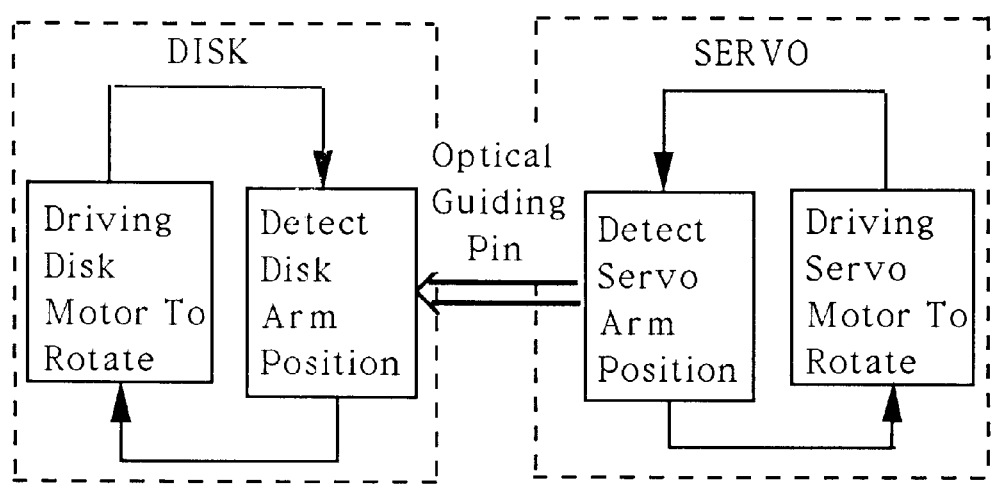

The positional training process comprises two main steps: writing and verifying the precise locations of the tracks of position information on all media disks. The writing and verifying processes must be performed by data heads 3 of the magnetic disk drive 22a. This servo track writing is to place the tracks of position information on all media disks 2 accurately by writing tracks of position information on each cylinder track. Referring to FIG. 4A, the block E1 is an external computer. It is a coordinator of a tractor beam position training system. This computer communicates with two control units in block E2 and block E3 for training the actuator in block E3. The block E3 is corresponding to the magnetic disk drive 22 or 22A with a sealed enclosure.

Figure 2A:
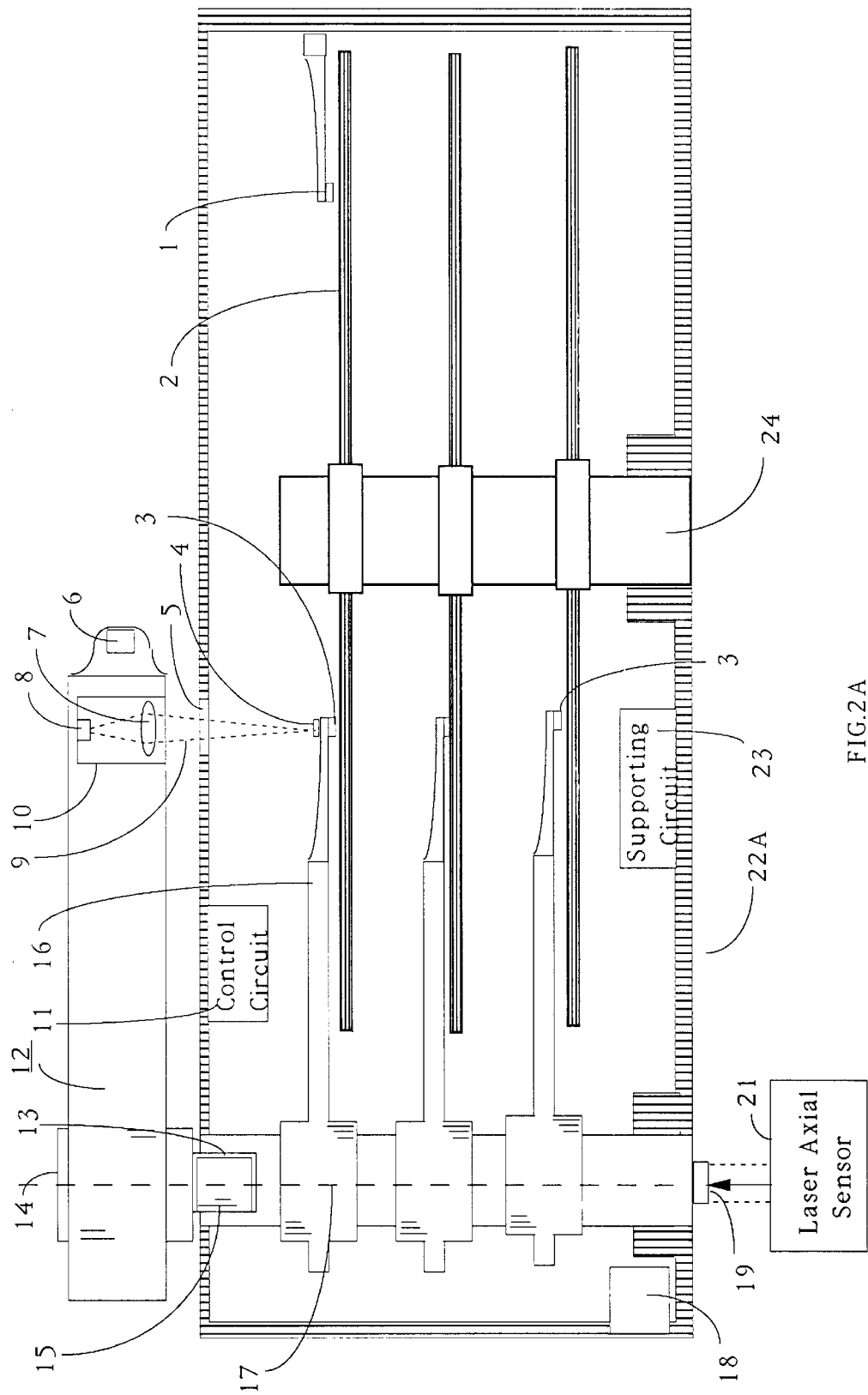
FIGS. 2A–2B show the different implementations developed for the universal portable mini-disk drive; (A) is the sectional view of the trainer actuator of the servo writer rotates to guide the trainee actuator of the magnetic disk drive to rotate with the laser pin; (B) is the sectional view of the optical disk transferring the track information to the magnetic disk drive with the laser pins.

Referring to FIG. 4A and FIG. 2A, after aligning the rotating axis of trainer actuator in block E2 with the rotating axis of the trainee actuator 16, external computer E1 issues a command to request the magnetic disk 22A drive to spin up its spindle motor 24. A control unit of block E3 signals the external computer to proceed the positional training process for the magnetic disk drive 22A after obtaining a proper spindle motor speed. To accomplish this task, the external computer block E1 requests the movement of trainer actuator 12 to the first desired position. A closed loop position control system of the trainer actuator 12 utilizes the output of either the Micheson interferometer or an angular diffraction grating, angular optical encoder, as its position feedback signal to guide the movement precisely.

Based on the above principles, as shown in FIG. 2A, it shows one possible implementation of the magnetic disk drive 22A. The trainer actuator 12 utilizes a laser beam 9 focusing on the dual photo diodes 4 to guide the trainee actuator 16 to rotate. A closed loop position control for the trainee actuator 16 uses the outputs of the dual photo diodes 4 as its position feedback signal to follow the trainer actuator 12. The object position which is exactly below the trainer actuator 12.

When the trainee actuator 16 reaches and stabilizes at the desired position, the position training process begins. After completing the position training process, the control E3 signals the external computer E1 to move the trainer actuator 12 to rotate to the next desired position. The position training cycle then begins for this new desired position.

Figure 5:
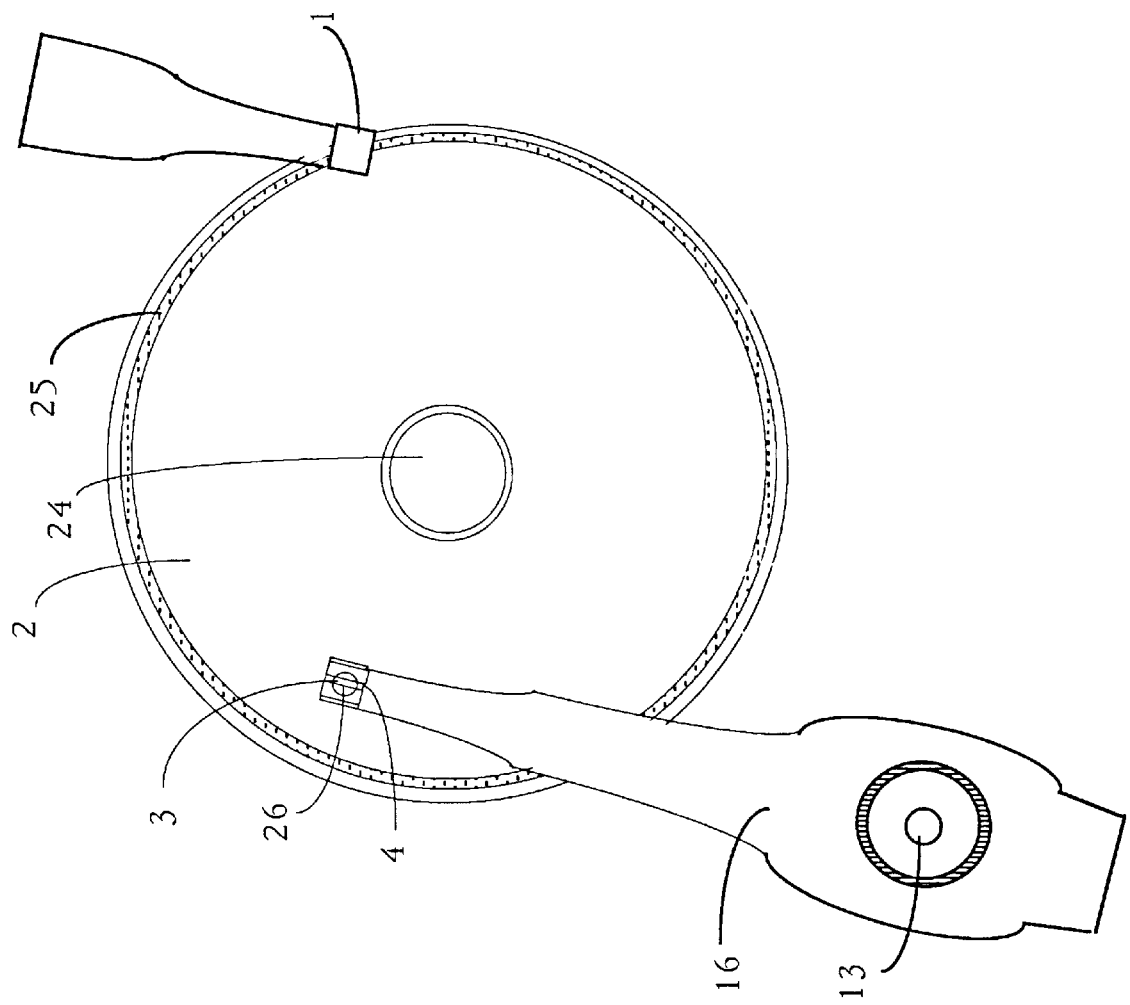
FIG. 5 is a top view of a laser receiving system and internal servo track timing system of the universal disk drive.
Figure 9:
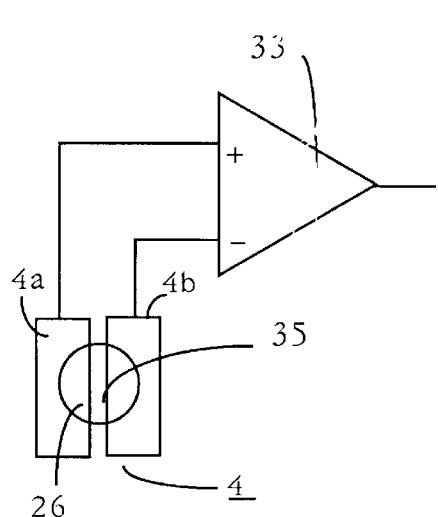
FIG. 9 is a top view showing the dual photo diodes with a focused laser spot.

FIG. 2A and FIG. 5 illustrate the schematic embodiment of the magnetic disk drive 22A. It has one transparent window 5 through which a laser beam 9 can pass. The dual photo diodes 4 attached to the head of the trainee actuator 16 is the position sensor of the trainee actuator 16 during the position training process. As shown in FIG. 9 and FIG. 2A, the center line 35 of these dual photo diodes 4 should pass through the rotating axis 17 of the trainee actuator 16. As shown in FIG. 5 and FIG. 2A, a stack of magnetic media disks 2 was previously recorded with a track (cylinder) 25 having the data pattern of the timing clock and the index mark. A fixed magnetic head 1 is attached to a stationary location near the path of magnetic recording data heads 3. The magnetic recording data head 3 of the magnetic disk drive 22a are carried by the trainee actuator 16.

As shown in FIG. 2A, all the external communications and the operations of the magnetic disk drive 22A are handled by a control unit 11 and the supporting circuits 23. The position training process must be performed before any magnetic disk drive can function. High track density requires a closed loop position system having a position feedback signal. To provide this position signal in the magnetic disk drive 22A, tracks of position information are placed on the media disks 2 by a tractor beam servo track writer (a tractor beam position training system).

Figure 6:
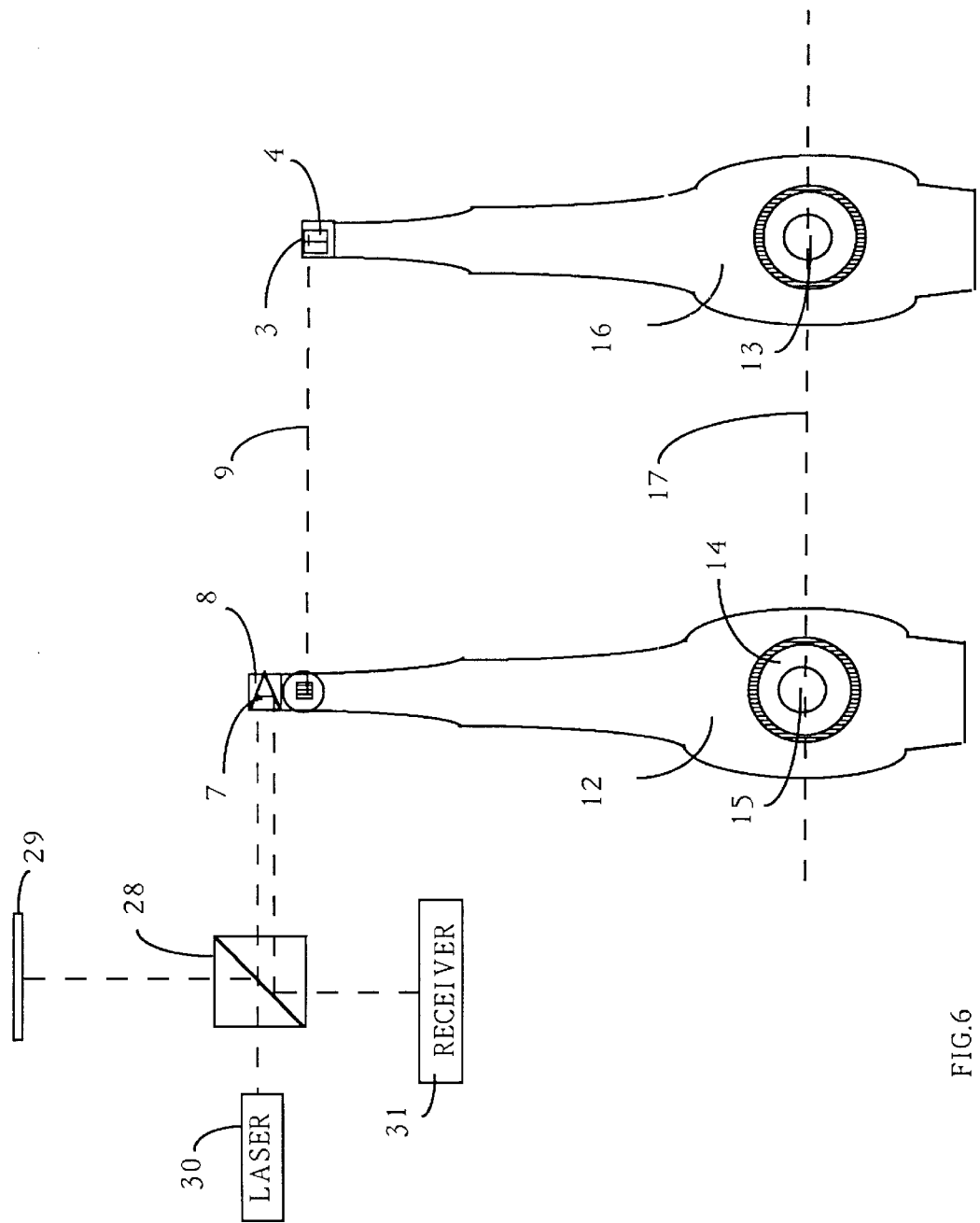
FIG. 6 shows another typical position sensor for the external positional reference of the trainer actuator.
Figure 7A:
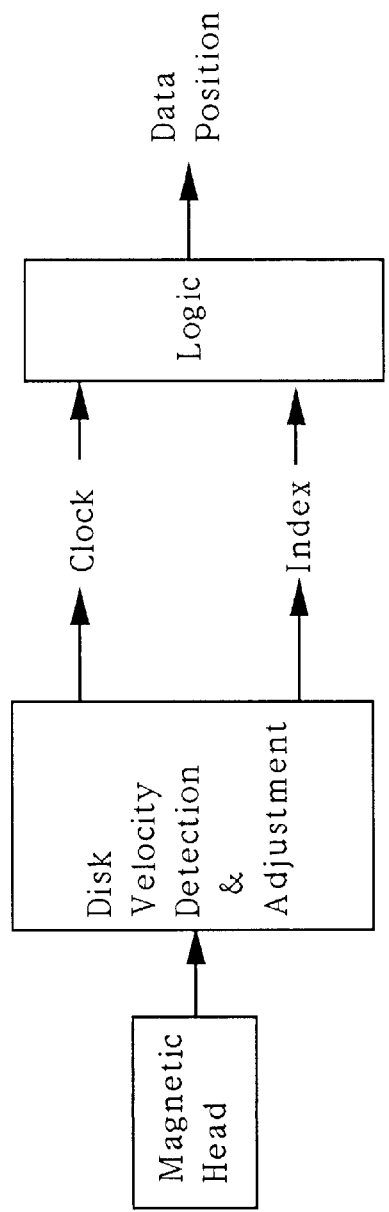
FIGS. 7A–7B, where: (A) shows the prior art converting the pulses to be the velocity domain then find the coordinate of the head that the search time and access time is longer; (B) shows our invention getting the coordinate of the head directly that there is no search time and the disk can play at any rotating speed of the disk.
Figure 7B:
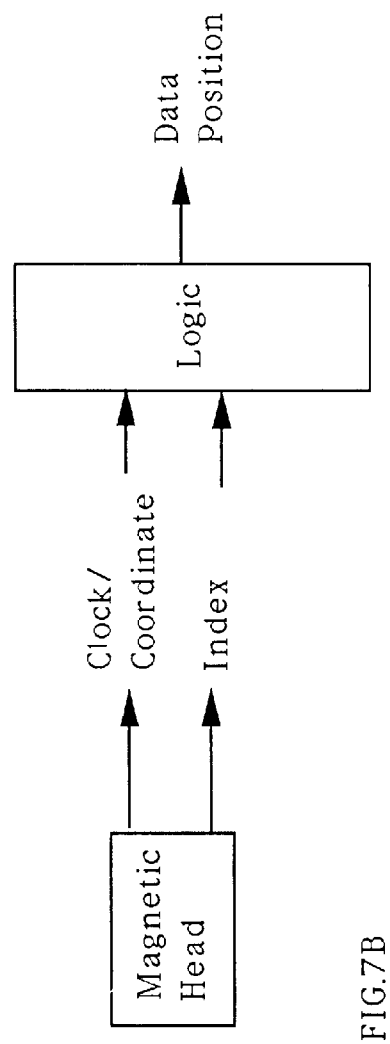

As shown in FIG. 2A, the tractor beam servo track writer comprises a trainer actuator 12. It carries a light source, a laser 10, which is generally a simple laser pen. A closed loop position control system of the trainer actuator 12 must utilize a position sensor such as a Michelson interferometer or an optical encoder. As shown in FIG. 6 or FIG. 1, the position sensor moves the trainer actuator 12 to a desired position with a high degree of precision. As shown in FIG. 6, the position accuracy is improved with a retroflector cube corner 6 being placed at the free end of the trainer actuator 12.

The trainer actuator 12 has a powerful voice coil motor to move its mechanical structure quickly without any mass restriction. There is no shape or material restriction to obtain the minimum resonant vibration. This resonance is a well known problem in the servo track writer design field.

After installing the final seal enclosure 22A, the magnetic disk drive is ready for the position training process. All fragile head disk assembly components (heads 1 and 3, and disks 2) are isolated from the normal (non-clean room) environment.

As shown in FIG. 2A, mechanical pin 15 and a hole 13 coarsely align the rotating axis 17 of the trainer actuator 12 and the trainee actuator 16. A precise axial alignment is accomplished by an axial laser sensor 21 and a laser reflector 19. After obtaining a proper spindle motor speed, the magnetic disk drive 22a is ready for the position training process.

The external computer E1 issues a command to move the trainer actuator 12 to a desired position. During the rotating process, the trainer actuator 12 uses a laser beam 9 to guide the trainee actuator 16 to rotate. A laser emitter 10 is attached to the trainer actuator 12. As shown in FIG. 6 and FIG. 9, the laser emitter 10 focuses its laser beam 9 on the dual photo diodes 4a and 4b on the trainee actuator 16. The center line 35 of the dual photo diodes 4 passes through the rotating axis 17 of the trainee actuator 16.

A closed loop position control system of the trainee actuator 16 uses the outputs from the dual photo diodes 4 as its position feedback signal. When trainee actuator 16 arrives at the desired position, the outputs from the dual photo diodes 4a and 4b are equal. When the trainee actuator 16 is stabilized at the desired position, the position training process progresses. When all the required tasks are completed, the control unit 11 signals the external computer E1 through connector 18 to move the trainer actuator 16 to the next desired position. Then, the new cycle begins. This cycle is repeated until all the media disks 2 have tracks of position information.

The movement of the trainer actuator 12 must be very precise. The external position of the trainer actuator 12 allows a designer to choose the best resolution position sensor 6 available without consideration of any geometry, weight, and cost restrictions. The cost is not an important factor because its use in the equipment for manufacturing not the final customer product.

The linkage between the trainee actuator 16 and the trainer actuator 12 is a laser beam 9 and the dual photo diodes 4. The mass of the dual photo diodes 4 is very small as compared to other position sensors such as an angular diffraction grating. The dual diode chip is very cheap comparing to the expensive and massive angular diffraction grating ( 20 cents for the dual photo diode chip and 200 dollars for the angular diffraction grating). Due to the clean isolated environment of the magnetic disk drive, The dual photo diode chip can be used without any transparent protection case which is the major cost of the conventional photo diode module. The tiny mass of the dual photo diodes chip allows designer to place this diode chip 4 to the similar locations of the magnetic data heads. While minimizing cost, this arrangement will provide the best matched mechanical linkage to generate the best resolution and maximum repeatability for the servo system of magnetic disk drive.

As shown in FIG. 5, the fixed magnetic head 1 reads the previously recorded data track 25. This track 25 has the clock/coordinate patterns and an embedded index mark on one of the magnetic disk surfaces 2. The clock/coordinate patterns and the index mark are previously recorded and verified during the magnetic disk testing process. This media disk testing process is a part of the magnetic disk drive manufacturing process. Hence, there is no additional step required to record this information. The position training process of the present invention requires the servo writing timing/coordinate clock and the index pulse. To provide this servo writing timing clock/coordinate and the index pulse, the supporting circuits 23 drives the output of the fixed magnetic head 1.

The speed of the magnetic disk drive spindle motor 24 is a critical parameter. A closed loop speed control system must have the best velocity sensor. The fixed magnetic head 1 is also utilized as the speed sensor for the spindle motor 24. The head 1 can provide enough pulses per revolution and sufficient position information to smooth out the torque ripple of the brushless DC spindle motor 24. Therefore, precise synchronization between the spindle motor 24 and the crystal system clock is obtained. This precise synchronization improves the signal to noise ratio of the system. This in turn allows increased bit density. Such precise synchronization as in the present invention never occurs in the prior art.

ALTERNATE EMBODIMENT

Figure 11:
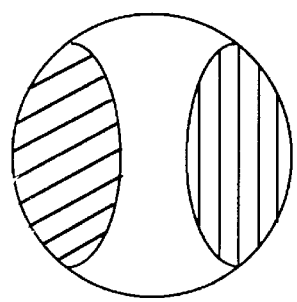
FIG. 11 is a typical reflective pattern when the trainer actuator is exactly above the trainee actuator.
Figure 12A:
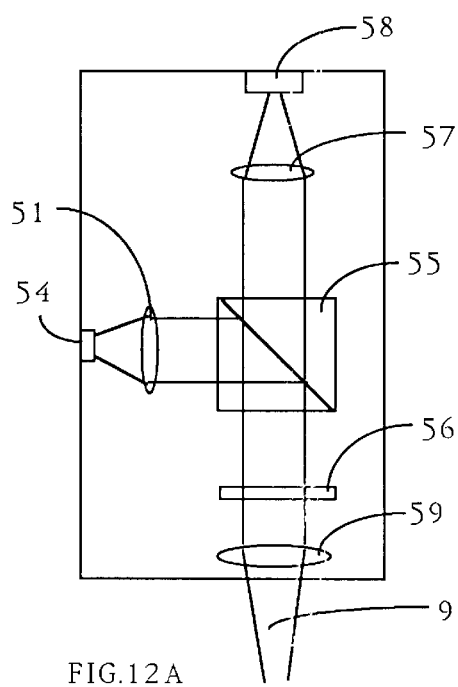
FIGS. 12A–12D show the sectional views of the complex laser pen functions with two reflective situations (the reflective element with dual phases and the simple reflective strip); (A) is the detailed structure for the laser pin for the servo writer; (B) is the laser pin for the dual-disk drive; (C) is the laser pin for the dual disk having the universal head; (D) is the laser pin for the dual disk having the laser pin served as the laser light source of the universal head.

As shown in FIG. 8, in an alternate embodiment, the dual photo diodes 4 can be replaced by a reflective element 32 with dual phases. This reflective element 32 is attached to the trainee actuator 6 or knotched on the head 3. The center line of the dual phase reflective element passes through he rotating axis 17 of the trainee actuator 16. As shown in FIG. 12A, in addition to emitting a laser beam, the new laser emitter attached to the trainer actuator 12 comprises a plurality of photo diodes 54. These photo diodes 54 receive the reflective patterns from the dual phase reflective element 32. The reflective patterns are directly related to the displacement between the trainer actuator 12 and the trainee actuator 16 (the magnetic disk drive actuator). FIG. 11 shows the typical receiving reflective pattern when the trainer actuator 12 is exactly above the trainee actuator 16.

A position feedback signal can be derived from the reflective pattern. The external computer E1 feeds this position feedback signal to the control unit 11 on the magnetic disk drive through a connector 18. A closed loop position control system uses this position feedback signal to position the trainee actuator 16 precisely. As in the first preferred embodiment, the trainer actuator 12 guides the trainee actuator 16 to rotate to the desired position through the non-contact linkage 9, laser pin.

Figure 8A:
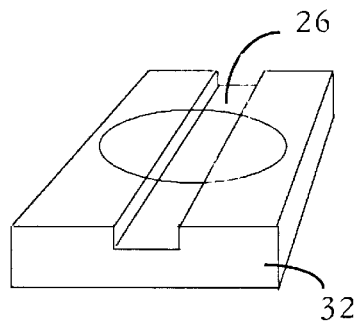
FIGS. 8A–8B show the compact reflective device which can be knotched on the read/write head directly; (A) is a typical dual phase reflective component with one groove; (B) is a typical dual phase reflective component with one land.
Figure 8B:
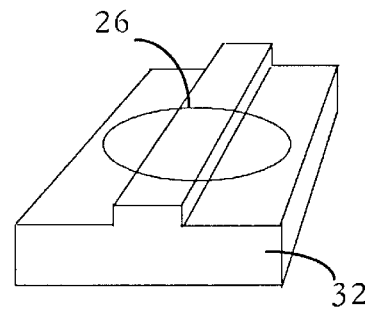
Figure 10:
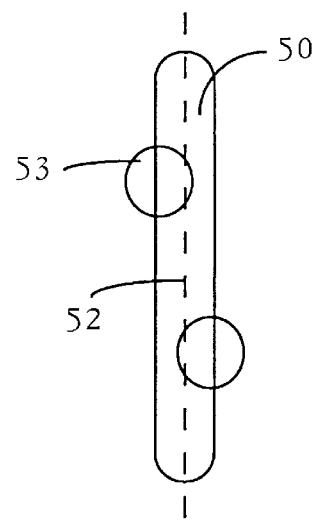
FIG. 10 is a top view showing the dual laser beams focusing on a reflective strip attached to the trainee actuator (magnetic disk drive actuator).

FIG. 12 illustrates the sectional views of several different complex laser pin. The complex laser pen is utilized with both the dual phase reflective element 32 (as shown in FIG. 8A and FIG. 8B) or the simple reflective strip 50 (as shown in FIG. 10). As shown in FIG. 12A, the complex laser pen comprises one laser diode 58, a lens system (51, 57 and 59), a polarizing beam splitter cube (PBSC) 55, a transparent diffraction grating 56, and the plurality of photo diodes 54. The lens 57 is the collimating lens of the incident laser beam. The lens 51 is the focusing lens of the reflective laser beam. The lens 59 is the focusing lens of the incident laser beam. This lens 59 is also the collimating lens of the reflective laser beam. The photo diodes 54 receive only the reflective laser beam.

OTHER ALTERNATE EMBODIMENTS

As shown in FIG. 10 and FIG. 2A, the dual photo diodes 4 can also be replaced by a reflective strip 50 knotched on the trainee actuator 16 or head 3. The center line 52 of the reflective strip 50 passes through the axis of the trainee actuator 16. As shown in FIG. 10, a dual beam laser emitter attached to trainer actuator 12 focuses its plurality of radiation beams on the reflective strip. The center line of the dual laser beams 52 passes through the rotating axis 17 of the trainer actuator 12. A plurality of photo diodes 54, affixed to trainer actuator 12, receive the dual reflective laser beams from the reflective strip 50. The outputs of the photo diodes 54 are equal when the trainer actuator 12 is exactly above the trainee actuator 16. A closed loop position control system of the trainee actuator 16 utilizes the outputs of a plurality of photo diodes 54 as its position feedback signal. Hence, the trainee actuator 16 can follow the trainer actuator 12 to rotate precisely.

Additionally, the refraction pattern can be created with a non-reflective strip affixed to a reflective background. Furthermore, as shown in FIG. 11, another method of replacement for the dual photo diodes 4 is simply a pattern of dots. So long as the dots are symmetrical about a center line of the axis of the trainee actuator 16, the system will be able to determine the proper position for the actuators. So, as long as the head 3 having the symmetrical shape with respect to the axis of the trainee actuator 16, the head 3 can serve as the reflective type strip.

ANOTHER ALTERNATE EMBODIMENT

Figure 2B:
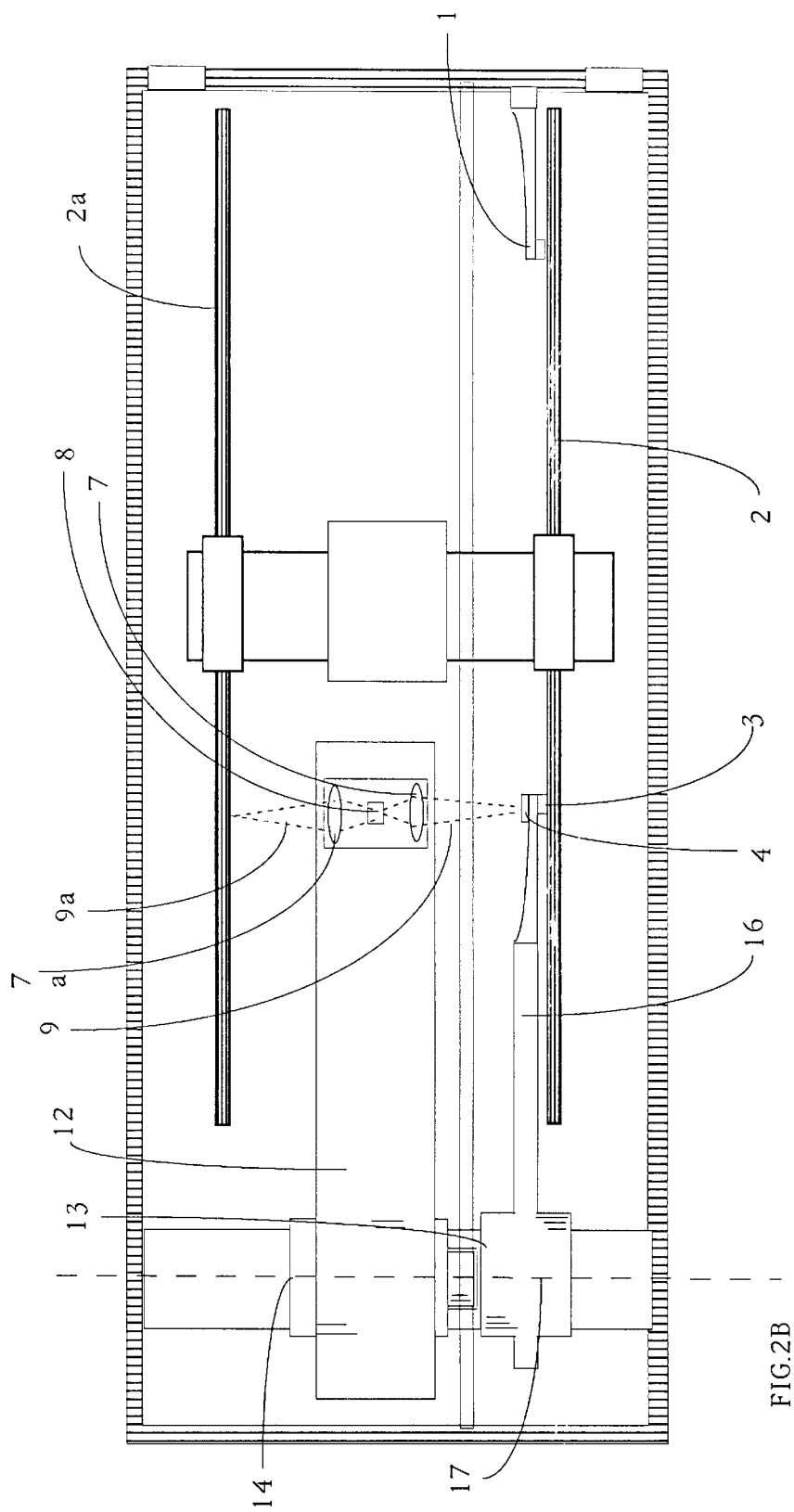

As shown in FIG. 2B, an optical head 10 attached to the trainer actuator 12 focuses its laser beam 9 on both the optical media diskette 2a and the position interpreter 4. This position interpreter 4 is also fasten to the trainee actuator 16. A closed loop position control circuit can utilize the outputs of the position interpreter 4 as the position feed back signal to follow the trainer actuator 12 precisely. Instead of utilizing Michelson Interferometer or an angular diffraction grating, during servo writing process (placing tracks of position information) of the magnetic media disk, the optical head 10a can read the tracks of position information on the optical media diskette 2a to determine the position of the trainer actuator. A closed loop position controller seeks and maintains the trainer actuator 12 at the subject position precisely. By means of the position interpreter 4 and the laser beam 9, so does the trainee actuator 16. Once the trainee actuator 16 has settled at the subject position, the process for placing track position information begins. After recording the track of position information at the subject position of the magnetic media disk, the trainer actuator 16 moves to the next subject position and so does the trainee actuator 12 by following the trainer actuator 16. The next recording track of position information begins after the trainee actuator 12 arrives the next subject position. This recording track of position information continues until all tracks of position information recorded on all magnetic media disks or diskettes.

Figure 12B:
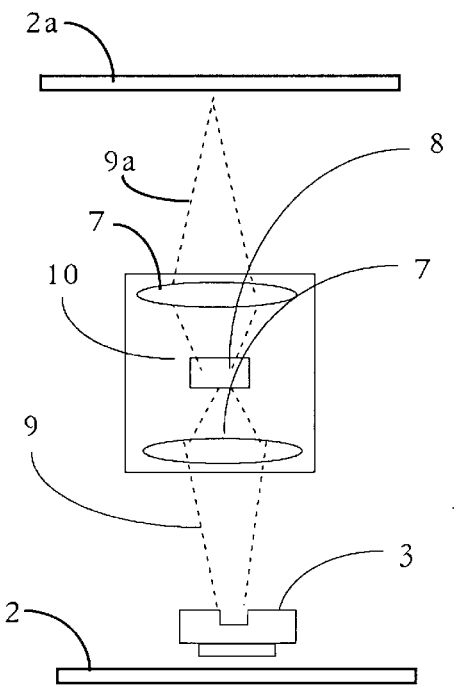
Figure 12C:
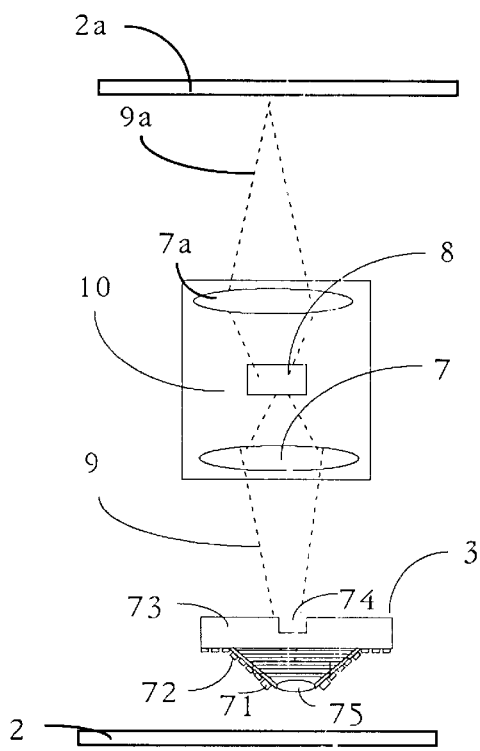
Figure 12D:
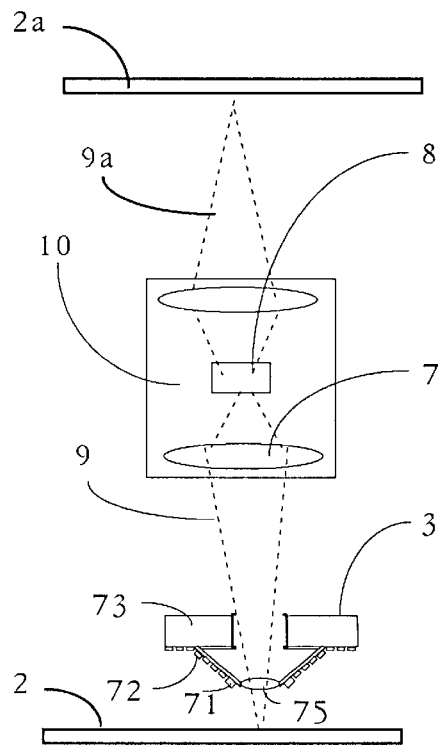

FIG. 12B shows the different laser pin for the alternative design. The laser diode 8 emits the upper laser beam 9a and the lower laser beam 9. The lower laser beam 9 focuses on the knotch on the read/write head 3 of the trainee actuator with the lens 7. The upper laser beam 9a focuses on the optical disk 2a with the lens 7a to read the track information pre-recorded on the disk 2a. The laser beam 9a and laser beam 9 had better to align in one vertical line which is perpendicular to both the rotating plane of trainee and the optical disk 2a. In FIG. 12C, the head 3 is replaced with the universal head. It can read/write all the different disks 2 such as the optical disk, magnetic disk and the magnetoptic disk. As shown in FIG. 1J, the head use the surface emitting laser diode 77 to generate the laser. FIG. 12D shows another implementation of the universal head. The universal head takes advantage of the laser beam of the laser pin 9. The laser pin 9 is also served as the optical read/write light source. After the actuator aligns the head with the laser pin 8, the optical detector 72 reads the laser light reflected from the disk.

The above disclosure is not intended as limiting. Those skilled in the art will readily observe that numerous modifications and alterations of the device may be made while retaining the teachings of the invention. Accordingly, the above disclosure should be construed as limited only by metes and bounds of the appended claims.

We claim:

1. A portable disk drive system comprises a dual-arm means, axial central means, direct-overhead means, optical pin means, master track detect means, master loop control means, slave loop control means and a slave disk means, said dual-arm means further comprising a master arm means and a slave arm means;

said slave arm means further comprising a read and write head means and a compact radiation detect means;

said read and write head reading and writing data on said slave disk;

said optical pin means being mounted on said master arm;

said central axial means aligning the axle of movement to be coincidence;

said direct-overhead means aligning said optical pin means direct above said radiation detector means of said slave arm means;

said master arm and slave arm adopting a same pattern of movement that said master arm always being able to tracing said slave arm to have direct-overhead projection for said optical pin means;

said master arm means being stiff to support said optical pin means;

said slave means detecting radiation to track fast wobbling movement of said slave disk means;

said radiation detector means being able to trace movement of said optical pin dynamically without track jumping error and it being so light that it being able support by said slave arm;

said master track detecting means guiding said master arm to predetermined track position;

said master loop control means guiding said master arm to follow output of said master track detecting means;

said axial central means first aligning said axle of said master arm with said axle of said slave arm; then said master arm moving to have said radiation detector means detecting radiation; then said direct-overhead means moving to have said optical pin being direct above said radiation detect means; as said radiation detect means sensing said optical pin being direct above said read and write head, said radiation detect means notifying said master arm starting to move to new track position; said radiation detect means notifying said slave arm to trace movement of said arm dynamically to reduce radiation signal to be signal level of direct overhead radiation signal level; said slave arm tracing said optical pin to move; said master arm carry said optical pin to move that said slave arm tracing said master arm to move; a track position of said slave arm being specified at a track position by said master arm.

2. A portable universal disk drive system means according to claim 1 further comprises a master disk, said master track detect means being mounted directly above said optical pin;

said master track detect means reading track information recorded on said master disk;

said master track detect means reading track on said master disk to locate track position;

said loop control means feeding back signal to have said master arm to track said track position.

3. A portable universal disk drive system means according to claim 2 of which said master disk being an optic disk means.

4. A portable universal disk drive system means according to claim 3 of which said slave disk records magnetic data.

5. A portable universal disk drive system means according to claim 1 wherein said master detect means further comprises a diffraction grating means to identify master track position of said master arm means.

6. A portable universal disk drive system means according to claim 2 wherein said diffraction grating means being linear grating means with curvilinear form with center being the center being coincidence off said master arm means.

7. A portable universal disk drive system means according to claim 1 wherein said master detect means further comprises a plurality of reflective strips means to identify master track position of said master arm means.

8. A portable universal disk drive system means according to claim 2 wherein said reflective strips means is in curvilinear form with center being the center being coincidence off said master arm means.

9. A portable universal system means according to claim 1 wherein said radiation detector means is an array of photo detector means.

10. A portable universal disk drive system means according to claim 1 wherein said radiation detector means is an array of radiation reflective means.

11. A universal disk drive system according to claim 1 further comprises timing/coordinate subsystem, said timing/coordinate subsystem comprising an actuator reading a timing/coordinate track on a slave disk.

12. A universal disk drive system according to claim 11 further comprising signal processing means to convert timing/coordinate signals to be cylindrical coordinate of a data actuator located on said slave disk.

13. A portable universal disk drive system means according to claim 1 wherein said radiation detector means is mounted on the read and write means at a tip of said slave arm.

14. A portable universal disk drive system means according to claim 1 wherein said radiation detector means has asymmetrical output signal to detect both position and velocity errors.

15. A portable universal disk drive system means according to claim 1 wherein said read and write means is a universal head subsystem, said universal head subsystem comprising a universal head being mounted on said slave arm;

said universal head comprising a magnet head means, a radiation emitting means and a radiation detecting means.

16. A portable universal disk drive system according to claim 15 wherein said magnet head means comprising a spiral thin film.

17. A portable universal disk drive system according to claim 15 wherein said radiation emitting means is a surface emitting diode.

18. A portable universal disk drive system according to claim 15 wherein said magnet head means being a spiral thin film surrounding said radiation detecting means and said radiating detecting means surrounding said radiation emitting means.

* * * * *